United States Patent
Wang et al.

(10) Patent No.: US 9,432,166 B2
(45) Date of Patent: Aug. 30, 2016

(54) METHOD AND APPARATUS FOR TRANSMITTING HYBRID AUTOMATIC REPEAT REQUEST INDICATOR INFORMATION

(71) Applicant: Huawei Device Co., Ltd., Shenzhen, Guangdong (CN)

(72) Inventors: Jian Wang, Beijing (CN); Lei Guan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 30 days.

(21) Appl. No.: 14/327,149

(22) Filed: Jul. 9, 2014

(65) Prior Publication Data

US 2014/0348085 A1    Nov. 27, 2014

Related U.S. Application Data

(63) Continuation of application No. PCT/CN2013/075997, filed on May 21, 2013.

(51) Int. Cl.
*H04W 72/02* (2009.01)
*H04L 5/00* (2006.01)
(Continued)

(52) U.S. Cl.
CPC .......... *H04L 5/0053* (2013.01); *H04L 1/1816* (2013.01); *H04L 1/1887* (2013.01); *H04L 1/1893* (2013.01); *H04L 1/1896* (2013.01); *H04L 5/0051* (2013.01); *H04L 5/0055* (2013.01); *H04W 72/02* (2013.01); *H04W 72/0413* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 2013/0034028 A1 | 2/2013 | Chen et al. | |
| 2013/0121276 A1* | 5/2013 | Kim | H04W 72/0406 370/329 |
| 2013/0235812 A1* | 9/2013 | Heo | H04L 5/0037 370/329 |

(Continued)

FOREIGN PATENT DOCUMENTS

| | | |
|---|---|---|
| CN | 102056228 A | 5/2011 |
| CN | 102377548 A | 3/2012 |

(Continued)

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.5.0, pp. 1-101, 3$^{rd}$ Generation Partnership Project, Valbonne, France (Jun. 2012).

(Continued)

*Primary Examiner* — Ian N Moore
*Assistant Examiner* — Lakeram Jangbahadur
(74) *Attorney, Agent, or Firm* — Leydig, Voit & Mayer, Ltd.

(57) ABSTRACT

Embodiments of the present invention relate to a method and an apparatus for transmitting hybrid automatic repeat request indicator information. The method for transmitting hybrid automatic repeat request indicator information according to the present invention includes: allocating enhanced physical downlink control channel EPDCCH resources to a UE; selecting partial resources from the EPDCCH resources; and sending HARQ indicator information to the UE through the partial resources.

2 Claims, 14 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2013/0242882 A1* | 9/2013 | Blankenship | H04W 72/0453 370/329 |
| 2013/0301597 A1* | 11/2013 | Kim | H04W 72/042 370/329 |
| 2014/0092820 A1* | 4/2014 | Ye | H04L 5/0053 370/329 |

FOREIGN PATENT DOCUMENTS

| | | |
|---|---|---|
| CN | 102595620 A | 7/2012 |
| EP | 2555458 A2 | 2/2013 |
| WO | 2013048892 A1 | 4/2013 |

OTHER PUBLICATIONS

"3$^{rd}$ Generation Partnership Project; Technical Specification Group Radio Access Network; Evolved Universal Terrestrial Radio Access (E-UTRA); Multiplexing and channel coding (Release 11)," 3GPP TS 36.212, V11.0.0, pp. 1-79, 3$^{rd}$ Generation Partnership Project, Valbonne, France (Sep. 2012).

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.7.0, pp. 1-126, 3$^{rd}$ Generation Partnership Project, Valbonne, France (Sep. 2012).

"Considerations on ePHICH Design," 3GPP TSG RAN WG1 Meeting #69, Prague, Czech Republic, R1-122654, 3rd Generation Partnership Project, Valbonne, France (May 21-25, 2012).

* cited by examiner

| 0 | 12 | 8 | 4 | 0 |    |    | 8  | 4  | 0 | 12 | 8  |   |    |
|---|----|---|---|---|----|----|----|----|---|----|----|---|----|
| 1 | 13 | 9 | 5 | 1 |    |    | 9  | 5  | 1 | 13 | 9  |   |    |
| 2 | 14 | 10| 6 | 2 | 12 | 2  | 10 | 6  | 2 | 14 | 10 | 4 | 10 |
| 3 | 15 | 11| 7 | 3 | 13 | 3  | 11 | 7  | 3 | 15 | 11 | 5 | 11 |
| 4 | 0  | 12| 8 | 4 | 14 | 4  | 12 | 8  | 4 | 0  | 12 | 6 | 12 |
| 5 | 1  | 13| 9 | 5 |    |    | 13 | 9  | 5 | 1  | 13 |   |    |
| 6 | 2  | 14|10 | 6 |    |    | 14 | 10 | 6 | 2  | 14 |   |    |
| 7 | 3  | 15|11 | 7 | 15 | 5  | 15 | 11 | 7 | 3  | 15 | 7 | 13 |
| 8 | 4  | 0 |12 | 8 | 0  | 6  | 0  | 12 | 8 | 4  | 0  | 8 | 14 |
| 9 | 5  | 1 |13 | 9 | 1  | 7  | 1  | 13 | 9 | 5  | 1  | 9 | 15 |
|10 | 6  | 2 |14 |10 |    |    | 2  | 14 | 10| 6  | 2  |   |    |
|11 | 7  | 3 |15 |11 |    |    | 3  | 15 | 11| 7  | 3  |   |    |

| 0 | 12 | 8 | 4 | 0 |    |    | 8  | 4  | 0 | 12 | 8  |   |    |
|---|----|---|---|---|----|----|----|----|---|----|----|---|----|
| 1 | 13 | 9 | 5 | 1 |    |    | 9  | 5  | 1 | 13 | 9  |   |    |
| 2 | 14 | 10| 6 | 2 | 12 | 2  | 10 | 6  | 2 | 14 | 10 | 4 | 10 |
| 3 | 15 | 11| 7 | 3 | 13 | 3  | 11 | 7  | 3 | 15 | 11 | 5 | 11 |
| 4 | 0  | 12| 8 | 4 | 14 | 4  | 12 | 8  | 4 | 0  | 12 | 6 | 12 |
| 5 | 1  | 13| 9 | 5 |    |    | 13 | 9  | 5 | 1  | 13 |   |    |
| 6 | 2  | 14|10 | 6 |    |    | 14 | 10 | 6 | 2  | 14 |   |    |
| 7 | 3  | 15|11 | 7 | 15 | 5  | 15 | 11 | 7 | 3  | 15 | 7 | 13 |
| 8 | 4  | 0 |12 | 8 | 0  | 6  | 0  | 12 | 8 | 4  | 0  | 8 | 14 |
| 9 | 5  | 1 |13 | 9 | 1  | 7  | 1  | 13 | 9 | 5  | 1  | 9 | 15 |
|10 | 6  | 2 |14 |10 |    |    | 2  | 14 | 10| 6  | 2  |   |    |
|11 | 7  | 3 |15 |11 |    |    | 3  | 15 | 11| 7  | 3  |   |    |

FIG. 4B

| 0 | 12 | 8 | 4 | 0 |   |   | 8 | 4 | 0 | 12 | 8 |   |   |
|---|----|---|---|---|---|---|---|---|---|----|---|---|---|
| 1 | 13 | 9 | 5 | 1 |   |   | 9 | 5 | 1 | 13 | 9 |   |   |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 |   |   | 13 | 9 | 5 | 1 | 13 |   |   |
| 6 | 2 | 14 | 10 | 6 |   |   | 14 | 10 | 6 | 2 | 14 |   |   |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 |   |   | 2 | 14 | 10 | 6 | 2 |   |   |
| 11 | 7 | 3 | 15 | 11 |   |   | 3 | 15 | 11 | 7 | 3 |   |   |

| 0 | 12 | 8 | 4 | 0 |   |   | 8 | 4 | 0 | 12 | 8 |   |   |
|---|----|---|---|---|---|---|---|---|---|----|---|---|---|
| 1 | 13 | 9 | 5 | 1 |   |   | 9 | 5 | 1 | 13 | 9 |   |   |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 |   |   | 13 | 9 | 5 | 1 | 13 |   |   |
| 6 | 2 | 14 | 10 | 6 |   |   | 14 | 10 | 6 | 2 | 14 |   |   |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 |   |   | 2 | 14 | 10 | 6 | 2 |   |   |
| 11 | 7 | 3 | 15 | 11 |   |   | 3 | 15 | 11 | 7 | 3 |   |   |

FIG. 4C

| 0 | 12 | 8 | 4 | 0 | 8 | 0 | 12 | 8 | 4 |  |  |
|---|----|---|---|---|---|---|----|---|---|--|--|
| 1 | 13 | 9 | 5 |   |   | 1 | 13 | 9 | 5 | 0 | 8 |
| 2 | 14 | 10| 6 | 1 | 9 | 2 | 14 | 10| 6 | 1 | 9 |
| 3 | 15 | 11| 7 | 2 | 10| 3 | 15 | 11| 7 |   |   |
| 4 | 0  | 12| 8 |   |   | 4 | 0  | 12| 8 | 2 | 10|
| 5 | 1  | 13| 9 | 3 | 11| 5 | 1  | 13| 9 | 3 | 11|
| 6 | 2  | 14| 10| 4 | 12| 6 | 2  | 14| 10|   |   |
| 7 | 3  | 15| 11|   |   | 7 | 3  | 15| 11| 4 | 12|
| 8 | 4  | 0 | 12| 5 | 13| 8 | 4  | 0 | 12| 5 | 13|
| 9 | 5  | 1 | 13| 6 | 14| 9 | 5  | 1 | 13|   |   |
| 10| 6  | 2 | 14|   |   | 10| 6  | 2 | 14| 6 | 14|
| 11| 7  | 3 | 15| 7 | 15| 11| 7  | 3 | 15| 7 | 15|

| 0 | 12 | 8 | 4 | 0 | 8 | 0 | 12 | 8 | 4 |  |  |
|---|----|---|---|---|---|---|----|---|---|--|--|
| 1 | 13 | 9 | 5 |   |   | 1 | 13 | 9 | 5 | 0 | 8 |
| 2 | 14 | 10| 6 | 1 | 9 | 2 | 14 | 10| 6 | 1 | 9 |
| 3 | 15 | 11| 7 | 2 | 10| 3 | 15 | 11| 7 |   |   |
| 4 | 0  | 12| 8 |   |   | 4 | 0  | 12| 8 | 2 | 10|
| 5 | 1  | 13| 9 | 3 | 11| 5 | 1  | 13| 9 | 3 | 11|
| 6 | 2  | 14| 10| 4 | 12| 6 | 2  | 14| 10|   |   |
| 7 | 3  | 15| 11|   |   | 7 | 3  | 15| 11| 4 | 12|
| 8 | 4  | 0 | 12| 5 | 13| 8 | 4  | 0 | 12| 5 | 13|
| 9 | 5  | 1 | 13| 6 | 14| 9 | 5  | 1 | 13|   |   |
| 10| 6  | 2 | 14|   |   | 10| 6  | 2 | 14| 6 | 14|
| 11| 7  | 3 | 15| 7 | 15| 11| 7  | 3 | 15| 7 | 15|

FIG. 4D

| 0 | 12 | 8 | 4 | 0 |    |   | 8  | 4  | 0 | 12 | 8  |   |    |
|---|----|---|---|---|----|---|----|----|---|----|----|---|----|
| 1 | 13 | 9 | 5 | 1 |    |   | 9  | 5  | 1 | 13 | 9  |   |    |
| 2 | 14 | 10| 6 | 2 | 12 | 2 | 10 | 6  | 2 | 14 | 10 | 4 | 10 |
| 3 | 15 | 11| 7 | 3 | 13 | 3 | 11 | 7  | 3 | 15 | 11 | 5 | 11 |
| 4 | 0  | 12| 8 | 4 | 14 | 4 | 12 | 8  | 4 | 0  | 12 | 6 | 12 |
| 5 | 1  | 13| 9 | 5 |    |   | 13 | 9  | 5 | 1  | 13 |   |    |
| 6 | 2  | 14| 10| 6 |    |   | 14 | 10 | 6 | 2  | 14 |   |    |
| 7 | 3  | 15| 11| 7 | 15 | 5 | 15 | 11 | 7 | 3  | 15 | 7 | 13 |
| 8 | 4  | 0 | 12| 8 | 0  | 6 | 0  | 12 | 8 | 4  | 0  | 8 | 14 |
| 9 | 5  | 1 | 13| 9 | 1  | 7 | 1  | 13 | 9 | 5  | 1  | 9 | 15 |
| 10| 6  | 2 | 14| 10|    |   | 2  | 14 | 10| 6  | 2  |   |    |
| 11| 7  | 3 | 15| 11|    |   | 3  | 15 | 11| 7  | 3  |   |    |

| 0 | 12 | 8 | 4 | 0 |    |   | 8  | 4  | 0 | 12 | 8  |   |    |
|---|----|---|---|---|----|---|----|----|---|----|----|---|----|
| 1 | 13 | 9 | 5 | 1 |    |   | 9  | 5  | 1 | 13 | 9  |   |    |
| 2 | 14 | 10| 6 | 2 | 12 | 2 | 10 | 6  | 2 | 14 | 10 | 4 | 10 |
| 3 | 15 | 11| 7 | 3 | 13 | 3 | 11 | 7  | 3 | 15 | 11 | 5 | 11 |
| 4 | 0  | 12| 8 | 4 | 14 | 4 | 12 | 8  | 4 | 0  | 12 | 6 | 12 |
| 5 | 1  | 13| 9 | 5 |    |   | 13 | 9  | 5 | 1  | 13 |   |    |
| 6 | 2  | 14| 10| 6 |    |   | 14 | 10 | 6 | 2  | 14 |   |    |
| 7 | 3  | 15| 11| 7 | 15 | 5 | 15 | 11 | 7 | 3  | 15 | 7 | 13 |
| 8 | 4  | 0 | 12| 8 | 0  | 6 | 0  | 12 | 8 | 4  | 0  | 8 | 14 |
| 9 | 5  | 1 | 13| 9 | 1  | 7 | 1  | 13 | 9 | 5  | 1  | 9 | 15 |
| 10| 6  | 2 | 14| 10|    |   | 2  | 14 | 10| 6  | 2  |   |    |
| 11| 7  | 3 | 15| 11|    |   | 3  | 15 | 11| 7  | 3  |   |    |

FIG. 4E

| 0 | 12 | 8 | 4 | 0 |    |   | 8 | 4 | 0 | 12 | 8 |   |    |
|---|----|---|---|---|----|---|---|---|---|----|---|---|----|
| 1 | 13 | 9 | 5 | 1 |    |   | 9 | 5 | 1 | 13 | 9 |   |    |
| 2 | 14 | 10| 6 | 2 | 12 | 2 | 10| 6 | 2 | 14 | 10| 4 | 10 |
| 3 | 15 | 11| 7 | 3 | 13 | 3 | 11| 7 | 3 | 15 | 11| 5 | 11 |
| 4 | 0  | 12| 8 | 4 | 14 | 4 | 12| 8 | 4 | 0  | 12| 6 | 12 |
| 5 | 1  | 13| 9 | 5 |    |   | 13| 9 | 5 | 1  | 13|   |    |
| 6 | 2  | 14| 10| 6 |    |   | 14| 10| 6 | 2  | 14|   |    |
| 7 | 3  | 15| 11| 7 | 15 | 5 | 15| 11| 7 | 3  | 15| 7 | 13 |
| 8 | 4  | 0 | 12| 8 | 0  | 6 | 0 | 12| 8 | 4  | 0 | 8 | 14 |
| 9 | 5  | 1 | 13| 9 | 1  | 7 | 1 | 13| 9 | 5  | 1 | 9 | 15 |
|10 | 6  | 2 | 14|10 |    |   | 2 | 14| 10| 6  | 2 |   |    |
|11 | 7  | 3 | 15|11 |    |   | 3 | 15| 11| 7  | 3 |   |    |

FIG. 5B

| 0 | 12 | 8 | 4 | 0 |    |   | 8 | 4 | 0 | 12 | 8 |   |    |
|---|----|---|---|---|----|---|---|---|---|----|---|---|----|
| 1 | 13 | 9 | 5 | 1 |    |   | 9 | 5 | 1 | 13 | 9 |   |    |
| 2 | 14 | 10| 6 | 2 | 12 | 2 | 10| 6 | 2 | 14 | 10| 4 | 10 |
| 3 | 15 | 11| 7 | 3 | 13 | 3 | 11| 7 | 3 | 15 | 11| 5 | 11 |
| 4 | 0  | 12| 8 | 4 | 14 | 4 | 12| 8 | 4 | 0  | 12| 6 | 12 |
| 5 | 1  | 13| 9 | 5 |    |   | 13| 9 | 5 | 1  | 13|   |    |
| 6 | 2  | 14| 10| 6 |    |   | 14| 10| 6 | 2  | 14|   |    |
| 7 | 3  | 15| 11| 7 | 15 | 5 | 15| 11| 7 | 3  | 15| 7 | 13 |
| 8 | 4  | 0 | 12| 8 | 0  | 6 | 0 | 12| 8 | 4  | 0 | 8 | 14 |
| 9 | 5  | 1 | 13| 9 | 1  | 7 | 1 | 13| 9 | 5  | 1 | 9 | 15 |
|10 | 6  | 2 | 14|10 |    |   | 2 | 14| 10| 6  | 2 |   |    |
|11 | 7  | 3 | 15|11 |    |   | 3 | 15| 11| 7  | 3 |   |    |

FIG. 5C

| 0 | 12 | 8 | 4 | 0 |   |   | 8 | 4 | 0 | 12 | 8 |   |   |
|---|----|---|---|---|---|---|---|---|---|----|---|---|---|
| 1 | 13 | 9 | 5 | 1 |   |   | 9 | 5 | 1 | 13 | 9 |   |   |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 |   |   | 13 | 9 | 5 | 1 | 13 |   |   |
| 6 | 2 | 14 | 10 | 6 |   |   | 14 | 10 | 6 | 2 | 14 |   |   |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 |   |   | 2 | 14 | 10 | 6 | 2 |   |   |
| 11 | 7 | 3 | 15 | 11 |   |   | 3 | 15 | 11 | 7 | 3 |   |   |

METHOD AND APPARATUS FOR TRANSMITTING HYBRID AUTOMATIC REPEAT REQUEST INDICATOR INFORMATION

CROSS-REFERENCE TO RELATED APPLICATIONS

This application is a continuation of International Patent Application No. PCT/CN2013/075997, filed on May 21, 2013, which is hereby incorporated by reference in its entirety.

TECHNICAL FIELD

The present invention relates to the field of communications technologies, and in particular, to a method and an apparatus for transmitting hybrid automatic repeat request indicator information.

BACKGROUND

In a general mobile communications system, a base station controls uplink data transmission of a UE by sending scheduling signaling. Due to channel fading, the base station may fail to correctly decode uplink data transmitted by the UE.

The 3rd Generation Partner Project (3GPP for short) Long Term Evolution (LTE for short) systems of release 8 to release 11 use hybrid automatic repeat request (HARQ for short) indicator information in a physical HARQ indicator channel of uplink data to indicate whether a base station correctly decodes uplink data transmitted by a UE. However, in the LTE systems of release 8 to release 11, the UE needs to use a common reference signal (CRS for short) as a reference signal to demodulate the indicator information in the physical HARQ indicator channel, determines, according to the indicator information, whether data transmitted in an uplink is correctly decoded, and thereby determines whether to retransmit the data that the base station cannot correctly decode.

With evolution of the LTE systems, in an LTE system of release 12, the CRS is no longer used for demodulation due to its inherent drawbacks. In the LTE system of release 12, a UE-specific demodulation reference signal (DMRS for short) instead of a physical HARQ indicator channel in the LTE systems of release 8 to release 11 is used for demodulation of downlink data transmitted in the system. Therefore, a base station cannot indicate, through the HARQ indicator channel, whether data transmitted by a UE in an uplink is correct and the UE certainly cannot determine whether the data transmitted in the uplink is correctly decoded by the base station. When the base station cannot correctly decode the received uplink data, the base station needs to send new scheduling signaling to instruct the UE to resend the data that the base station cannot correctly decode, which increases signaling load of a control channel of the system.

SUMMARY

Embodiments of the present invention provide a method and an apparatus for transmitting hybrid automatic repeat request indicator information, so that a UE can determine, by detecting HARQ indicator information transmitted by a base station, whether data transmitted in an uplink is correctly decoded by the base station and thereby determine whether to send new data or retransmit the previous data, thereby reducing signaling load of a control channel of a system.

In a first aspect, an embodiment of the present invention provides a method for transmitting hybrid automatic repeat request indicator information, including
allocating enhanced physical downlink control channel EPDCCH resources to a UE;
selecting partial resources from the EPDCCH resources; and
sending HARQ indicator information to the UE through the partial resources.

In a first possible implementation manner of the first aspect, the selecting partial resources from the EPDCCH resources includes:
selecting the partial resources from a physical resource block PRB pair of the EPDCCH resources.

According to the first aspect or the first possible implementation manner of the first aspect, in a second possible implementation manner, the sending HARQ indicator information to the UE through the partial resources includes:
dividing the partial resources into at least two parts, where the number of resource elements REs included in each part is in equality and no less than 2;
spreading the HARQ indicator information by a corresponding bit sequence according to the number of REs included in each part;
setting repeatedly the sequence-spread HARQ indicator information on the REs in each part; and
transmitting the partial resources to the UE.

According to the second possible implementation manner of the first aspect, in a third possible implementation manner, the dividing the partial resources into at least two parts includes:
dividing the partial resources into the at least two parts according to required HARQ channel capacity, where the number of spread sequences corresponding to the number of REs included in each part meets the required HARQ channel capacity.

According to the first aspect, in a fourth possible implementation manner, the selecting partial resources from the EPDCCH resources includes:
selecting the partial resources from at least two PRB pairs of the EPDCCH resources.

According to the fourth possible implementation manner of the first aspect, in a fifth possible implementation manner, the sending HARQ indicator information to the UE through the partial resources includes:
grouping the partial resources into at least one group, where each group includes REs in the at least two PRB pairs; and dividing each group into at least two parts, where the number of REs included in each part is in equality and no less than 2, and a product of the number of spread sequences corresponding to the number of REs included in each part and the number of groups is equal to the number of ECCEs included in the at least two PRB pairs;
spreading the HARQ indicator information by a corresponding bit sequence according to the number of REs included in each part;
setting repeatedly the sequence-spread HARQ indicator information on the REs in each part in one group; and
transmitting the partial resources to the UE.

According to the fifth possible implementation manner of the first aspect, in a sixth possible implementation manner, before the transmitting the partial resources to the UE, the method further includes:

associating, for a part in the one group, a demodulation reference signal DMRS in a PRB pair where the part resides, with the sequence-spread HARQ indicator information that is set in the part.

According to the sixth possible implementation manner of the first aspect, in a seventh possible implementation manner, each PRB pair includes the at least two parts in the one group, and the associating a DMRS in a PRB pair where the part resides, with the sequence-spread HARQ indicator information that is set in the part includes:

associating, for the at least two parts in the one group in one PRB pair, at least two DMRSs in the PRB pair with the sequence-spread HARQ indicator information that is set in the at least two parts.

According to any one of the fourth to seventh possible implementation manners of the first aspect, in an eighth possible implementation manner, the at least two PRB pairs are located in one EPDCCH PRB set configured for the UE or are located in different EPDCCH PRB sets configured for the UE.

According to the first aspect, in a ninth possible implementation manner, the selecting partial resources from the EPDCCH resources includes:

selecting the partial resources from one PRB pair of the EPDCCH resources, where the number of spread sequences corresponding to the number of REs included in the partial resources is equal to a value acquired by multiplying the number of ECCEs included in the one PRB pair by 2.

According to the ninth possible implementation manner of the first aspect, in a tenth possible implementation manner, the sending HARQ indicator information to the UE through the partial resources includes:

dividing the partial resources into at least one part, where the number of REs included in each part is in equality and no less than 2, and the number of spread sequences corresponding to the number of REs included in each part is equal to a value acquired by multiplying the number of ECCEs included in the one PRB pair by 2;

spreading the HARQ indicator information by a corresponding bit sequence according to the number of REs included in each part;

setting repeatedly the sequence-spread HARQ indicator information on the REs in each part; and transmitting the partial resources to the UE.

According to the tenth possible implementation manner of the first aspect, in an eleventh possible implementation manner, before the transmitting the partial resources to the UE, the method further includes:

associating one DMRS signal in the one PRB pair with the sequence-spread HARQ indicator information.

In a second aspect, an embodiment of the present invention provides a method for transmitting hybrid automatic repeat request indicator information, including:

receiving enhanced physical downlink control channel EPDCCH resources;

selecting partial resources from the EPDCCH resources; and extracting HARQ indicator information from the partial resources.

In a first possible implementation manner of the second aspect, the selecting partial resources from the EPDCCH resources includes:

selecting at least two parts from the EPDCCH resources, where the number of resource elements REs included in each part is in equality and no less than 2; and the extracting HARQ indicator information from the partial resources includes:

performing channel estimation according to a demodulation reference signal DMRS corresponding to each part in the at least two parts, and performing soft demodulation on each part to acquire soft information about each part; and performing, after combining the soft information about each part, sequence despreading according to the number of REs included in each part to acquire the HARQ indicator information; or performing channel estimation according to a demodulation reference signal DMRS corresponding to each part in the at least two parts, and performing soft demodulation on each part to acquire soft information about each part; performing sequence despreading on each part according to the number of REs included in each part to acquire sequence-despread soft information about each part; and combining the sequence-despread soft information about each part to acquire the HARQ indicator information.

According to the first possible implementation manner of the second aspect, in a second possible implementation manner, before the performing channel estimation according to a demodulation reference signal DMRS corresponding to each part in the at least two parts, the method further includes:

extracting, from a PRB pair to which each part belongs, the DMRS corresponding to each part.

According to the first or second possible implementation manner of the second aspect, in a third possible implementation manner, the selecting at least two parts from the EPDCCH resources includes:

selecting the at least two parts from at least two physical resource block PRB pairs of the EPDCCH resources, where the at least two parts include REs in the two PRB pairs.

According to the first or second possible implementation manner of the second aspect, in a fourth possible implementation manner, the selecting at least two parts from the EPDCCH resources includes:

selecting the at least two parts from one PRB pair of the EPDCCH resources.

In a third aspect, an embodiment of the present invention provides an apparatus for transmitting hybrid automatic repeat request HARQ indicator information, including:

an EPDCCH resource allocating module, configured to allocate enhanced physical downlink control channel EPDCCH resources to a UE;

a partial resource selecting module, configured to select partial resources from the EPDCCH resources; and an indicator information sending module, configured to send HARQ indicator information to the UE through the partial resources.

In a first possible implementation manner of the third aspect, the partial resource selecting module is specifically configured to select the partial resources from a physical resource block PRB pair of the EPDCCH resources.

According to the third aspect or the first possible implementation manner of the third aspect, in a second possible implementation manner, the indicator information sending module includes:

a first part dividing unit, configured to divide the partial resources into at least two parts, where the number of resource elements REs included in each part is in equality and no less than 2;

a first sequence spreading unit, configured to spread the HARQ indicator information by a corresponding bit sequence according to the number of REs included in each part;

a first information repeated setting unit, configured to repeatedly set the sequence-spread HARQ indicator information on the REs in each part; and a first partial resource transmitting unit, configured to transmit the partial resources to the UE.

According to the second possible implementation manner of the third aspect, in a third possible implementation manner, the first part dividing unit is specifically configured to divide the partial resources into the at least two parts according to required HARQ channel capacity, where the number of spread sequences corresponding to the number of REs included in each part meets the required HARQ channel capacity.

According to the third aspect, in a fourth possible implementation manner, the partial resource selecting module is specifically configured to select the partial resources from at least two PRB pairs of the EPDCCH resources.

According to the fourth possible implementation manner of the third aspect, in a fifth possible implementation manner, the indicator information sending module includes:

a second part dividing unit, configured to: group the partial resources into at least one group, where each group includes REs in the at least two PRB pairs; and divide each group into at least two parts, where a product of the number of spread sequences corresponding to the number of REs included in each part and the number of groups is equal to a value acquired by multiplying the number of ECCEs included in the at least two PRB pairs by 2;

a second sequence spreading unit, configured to spread the HARQ indicator information by a corresponding bit sequence according to the number of REs included in each part;

a second information repeated setting unit, configured to repeatedly set the sequence-spread HARQ indicator information on the REs in each part in one group; and a second partial resource transmitting unit, configured to transmit the partial resources to the UE.

According to the fifth possible implementation manner of the third aspect, in a sixth possible implementation manner, the apparatus further includes:

a first indicator information associating module, configured to associate, for a part in the one group before the second partial resource transmitting unit transmits the partial resources to the UE, a demodulation reference signal DMRS in a PRB pair where the part resides, with the sequence-spread HARQ indicator information that is set in the part.

According to the sixth possible implementation manner of the third aspect, in a seventh possible implementation manner, each PRB pair includes the at least two parts in the one group, and the first indicator information associating module is specifically configured to associate, for the at least two parts in the one group in one PRB pair, at least two DMRS signals in the PRB pair with the sequence-spread HARQ indicator information that is set in the at least two parts.

According to any one of the fourth to seventh possible implementation manners of the third aspect, in an eighth possible implementation manner, the at least two PRB pairs are located in one EPDCCH PRB set configured for the UE or are located in different EPDCCH PRB sets configured for the UE.

According to the third aspect, in a ninth possible implementation manner, the partial resource selecting module is specifically configured to select the partial resources from one PRB pair of the EPDCCH resources.

According to the ninth possible implementation manner of the third aspect, in a tenth possible implementation manner, the indicator information sending module includes:

a third part dividing unit, configured to divide the partial resources into at least one part, where the number of REs included in each part is in equality and no less than 2, and the number of spread sequences corresponding to the number of REs included in each part is equal to a value acquired by multiplying the number of ECCEs included in the one PRB pair by 2;

a third sequence spreading unit, configured to spread the HARQ indicator information by a corresponding bit sequence according to the number of REs included in each part;

a third information repeated setting unit, configured to repeatedly set the sequence-spread HARQ indicator information on the REs in each part; and a third partial resource transmitting unit, configured to transmit the partial resources to the UE.

According to the tenth possible implementation manner of the third aspect, in an eleventh possible implementation manner, the apparatus further includes:

a second indicator information associating module, configured to associate, before the third partial resource transmitting unit transmits the partial resources to the UE, one DMRS in the one PRB pair with the sequence-spread HARQ indicator information.

In a fourth aspect, an embodiment of the present invention provides an apparatus for transmitting hybrid automatic repeat request indicator information, including:

an EPDCCH resource receiving module, configured to receive enhanced physical downlink control channel EPDCCH resources;

a partial resource selecting module, configured to select partial resources from the EPDCCH resources; and an indicator information extracting module, configured to extract HARQ indicator information from the partial resources.

In a first possible implementation manner of the fourth aspect, the partial resource selecting module is specifically configured to select at least two parts from the EPDCCH resources, where the number of resource elements REs included in each part is in equality and no less than 2; and in equality and no less than the indicator information extracting module is specifically configured to perform channel estimation according to a demodulation reference signal DMRS corresponding to each part in the at least two parts, and perform soft demodulation on each part to acquire soft information about each part; and perform, after combining the soft information about each part, sequence despreading according to the number of REs included in each part to acquire the HARQ indicator information; or perform channel estimation according to a demodulation reference signal DMRS corresponding to each part in the at least two parts, and perform soft demodulation on each part to acquire soft information about each part; perform sequence despreading on each part according to the number of REs included in each part to acquire sequence-despread soft information about each part; and combine the sequence-despread soft information about each part to acquire the HARQ indicator information.

According to the first possible implementation manner of the fourth aspect, in a second possible implementation manner, the apparatus includes:

a DMRS extracting module, configured to extract, before the indicator information extracting module performs channel estimation according to the demodulation reference signal DMRS corresponding to each part in the at least two parts, the DMRS corresponding to each part from a PRB pair to which each part belongs.

According to the first or second possible implementation manner of the fourth aspect, in a third possible implementation manner, the partial resource selecting module is specifically configured to select the at least two parts from at least two physical resource block PRB pairs of the EPDCCH resources, where the at least two parts include REs in the two PRB pairs.

According to the first or second possible implementation manner of the fourth aspect, in a fourth possible implementation manner, the partial resource selecting module is specifically configured to select the at least two parts from one PRB pair of the EPDCCH resources.

With the method and the apparatus for transmitting hybrid automatic repeat request indicator information according to the embodiments of the present invention, enhanced physical downlink control channel EPDCCH resources are allocated to a UE, partial resources are selected from the EPDCCH resources, and HARQ indicator information is sent to the UE through the partial resources. Therefore, a base station can transmit the HARQ indicator information to the UE through the partial resources selected from the EPDCCH resources, and the UE can determine, by detecting the HARQ indicator information transmitted by the base station, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4B is a schematic diagram illustrating a specific implementation of S430 in the fourth embodiment of the present invention;

FIG. 4C is a schematic diagram illustrating another specific implementation of S430 in the fourth embodiment of the present invention;

FIG. 4D is a schematic diagram illustrating still another specific implementation of S430 in the fourth embodiment of the present invention;

FIG. 4E is a schematic diagram illustrating still another specific implementation of S430 in the fourth embodiment of the present invention;

FIG. 5B is a schematic diagram illustrating a specific implementation of S530 in the fifth embodiment of the present invention;

FIG. 5C is a schematic diagram illustrating another specific implementation of S530 in the fifth embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
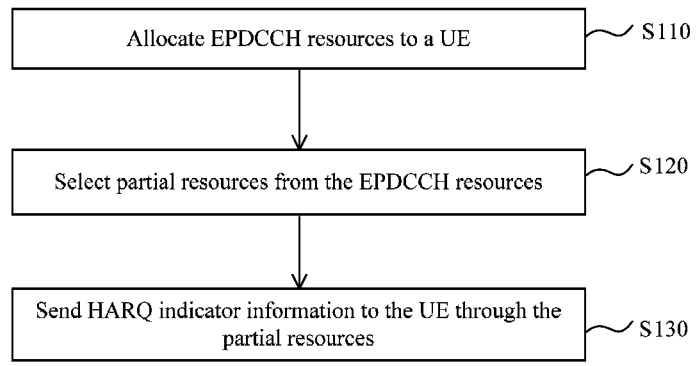
FIG. 1 is a flowchart of a method for transmitting HARQ indicator information according to a first embodiment of the present invention.

FIG. 1 is a flowchart of a method for transmitting HARQ indicator information according to a first embodiment of the present invention. The method is executed by a base station. As shown in FIG. 1, the method includes the following steps:

S110. Allocate EPDCCH resources to a UE.

Because the base station controls uplink data transmission of the UE by sending scheduling signaling to the UE and spectrum resources are required to carry the scheduling signaling that the base station sends to the UE, the base station allocates the spectrum resources used for carrying the scheduling signaling to the UE, which are generally enhanced physical downlink control channel (EPDCCH for short) resources.

S120. Select partial resources from the EPDCCH resources.

S130. Send HARQ indicator information to the UE through the partial resources.

The EPDCCH resources need to be demodulated by using a DMRS. Scheduling signaling on an EPDCCH may be demodulated by using a DMRS in a physical resource block (PRB for short) pair occupied by the EPDCCH resources as a reference signal. In this embodiment, the selecting partial resources from the EPDCCH resources to transmit HARQ indicator information is equivalent to designing an HARQ indicator channel on the EPDCCH. Because the HARQ indicator information is carried on the EPDCCH, the DMRS may also be used as the reference signal for demodulation.

With the method for transmitting HARQ indicator information according to this embodiment, partial resources are selected from EPDCCH resources and HARQ indicator information is sent to a UE through the partial resources. Therefore, a base station can transmit the HARQ indicator information to the UE through the partial resources selected from the EPDCCH resources, and the UE can determine, by detecting the HARQ indicator information transmitted by the base station, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Figure 2:
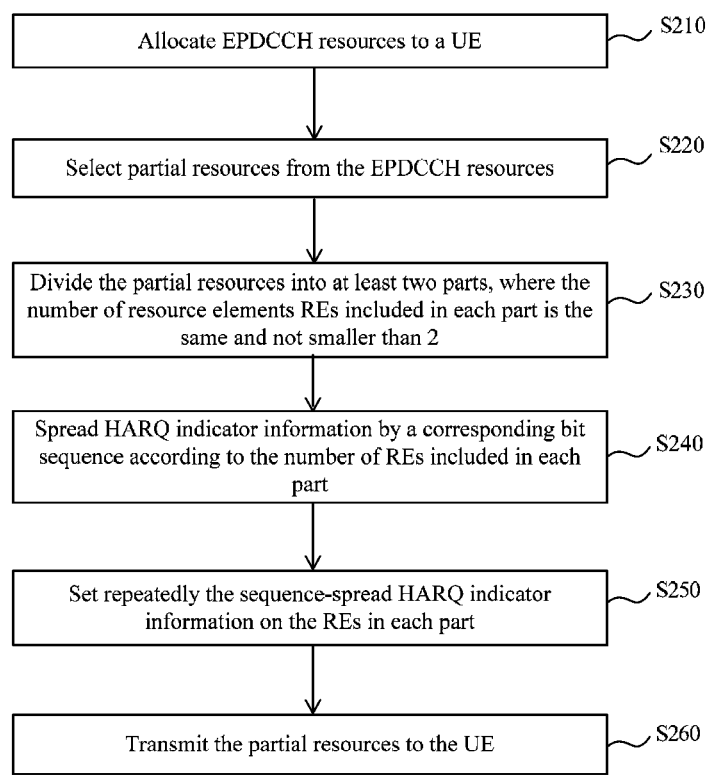
FIG. 2 is a flowchart of a method for transmitting HARQ indicator information according to a second embodiment of the present invention.

FIG. 2 is a flowchart of a method for transmitting HARQ indicator information according to a second embodiment of the present invention. This embodiment is further fractionized on a basis of the foregoing first embodiment. As shown in FIG. 2, the method according to this embodiment may include the following steps:

S210. Allocate EPDCCH resources to a UE.

S220. Select partial resources from the EPDCCH resources.

Specifically, the partial resources may be selected from a PRB pair of the EDPCCH resources.

S230. Divide the partial resources into at least two parts, where the number of resource elements REs included in each part is in equality and no less than 2.

S240. Spread HARQ indicator information by a corresponding bit sequence according to the number of REs included in each part.

The PRB pair includes an EPDCCH, where the EPDCCH is formed by ECCEs.

The selecting partial resources from the PRB pair of the EDPCCH resources may cause each enhanced control channel element ECCE in the PRB pair to include the same number of REs after the partial resources are selected.

For example, if each part includes two REs, the number of corresponding spread sequences is 2*2=4; if each part includes three REs, the number of corresponding spread sequences is 2*3=6.

Further, to meet required HARQ channel capacity, S230 may include: dividing, according to the required HARQ channel capacity, the partial resources into the at least two parts, where the number of spread sequences corresponding to the number of REs included in each part meets the required HARQ channel capacity. Specifically, the number of spread sequences stands for capacity of an HARQ indicator channel, namely, the quantity of the HARQ indicator information that can be simultaneously sent to the UE.

To facilitate subsequent applications, the required HARQ channel capacity is generally defined, during design, as maximum capacity of the HARQ indicator channel that the EPDCCH resources can carry.

S250. Set repeatedly the sequence-spread HARQ indicator information on the REs in each part.

For example, if the partial resources are divided into four parts and each part includes two REs, the HARQ indicator information is spread by a 2-bit sequence, that is, the original 1-bit HARQ indicator information is spread as 2-bit. Then the spread 2-bit HARQ indicator information is repeatedly set on REs in the four parts, that is, the 2-bit HARQ indicator information is set on the two REs in each part. Correspondingly, a power gain of the HARQ indicator information is 8 times, equivalent to 9 dB.

It should be noted that the partial resources may also not be divided into the at least two parts in S230. For example, if the partial resources are 8 REs, the HARQ indicator information may also be spread by an 8-bit sequence in S240, and the sequence-spread HARQ indicator information is set on the eight REs in S250. Correspondingly, the power gain of the HARQ indicator information is also 8 times, equivalent to 9 dB.

S260. Transmit the partial resources to the UE.

With the method for transmitting HARQ indicator information according to this embodiment, the HARQ indicator information is spread by a sequence whose bit quantity corresponds to the number of REs included in each part and the sequence-spread HARQ indicator information is repeatedly set on the REs in each part, so as to realize a power gain of the HARQ indicator information. In addition, because a base station transmits the sequence-spread HARQ indicator information that is repeatedly set on the REs in each part, to a UE, the UE can determine, by detecting the sequence-spread HARQ indicator information that is transmitted by the base station and repeatedly set on the REs in each part, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Figure 3:
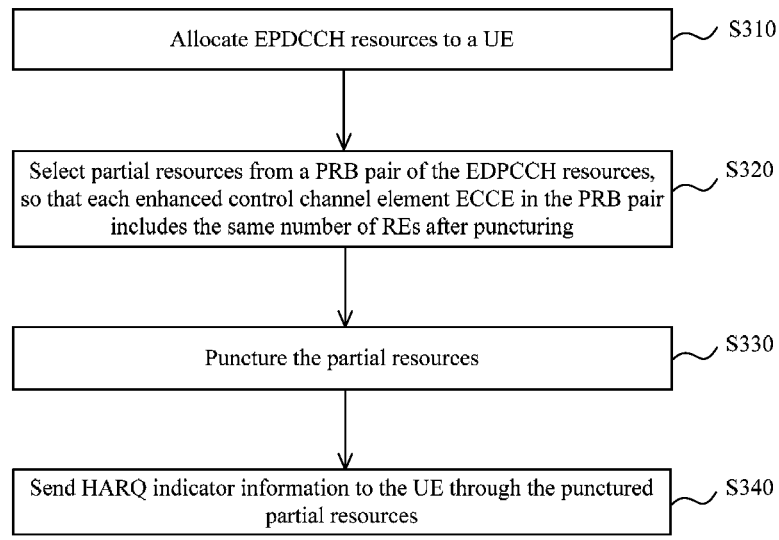
FIG. 3 is a flowchart of a method for transmitting HARQ indicator information according to a third embodiment of the present invention.

FIG. 3 is a flowchart of a method for transmitting HARQ indicator information according to a third embodiment of the present invention. This embodiment is further fractionized on a basis of the foregoing second embodiment. As shown in FIG. 3, the method according to this embodiment may include the following steps:

S310. Allocate EPDCCH resources to a UE.

S320. Select partial resources from a PRB pair of the EDPCCH resources, so that each enhanced control channel element (ECCE for short) in the PRB pair includes the same number of REs after puncturing.

When the PRB pair is a normal cyclic prefix (CP for short), the PRB pair is formed by 12 consecutive subcarriers in a frequency domain and 14 OFDM symbols in a time domain. The 12 consecutive subcarriers in the frequency domain and first 7 OFDM symbols in the time domain may be regarded as one PRB, and the 12 consecutive subcarriers in the frequency domain and last 7 OFDM symbols in the time domain may be regarded as another PRB. When the PRB pair is an extended CP, the PRB pair is formed by 12 consecutive subcarriers in a frequency domain and 12 OFDM symbols in a time domain. The 12 consecutive subcarriers in the frequency domain and first 6 OFDM symbols in the time domain may be regarded as one PRB, and the 12 consecutive subcarriers in the frequency domain and last 6 OFDM symbols in the time domain may be regarded as another PRB.

Generally, each PRB pair with a normal CP in an EPDCCH includes four enhanced control channel elements (ECCEs for short) and each PRB pair with an extended CP includes two ECCEs. In an extreme case, each ECCE may schedule uplink data transmission of one user and each uplink data transmission may support transmission of a maximum of two data blocks, requiring two pieces of HARQ indicator information. Therefore, each PRB pair with a normal CP needs to meet a requirement of a maximum of four users, namely, a total of eight pieces of HARQ indicator information, and each PRB pair with an extended CP needs to meet a requirement of a maximum of two users, namely, a total of four pieces of HARQ indicator information. Specifically, each ECCE includes the same number of REs. The same number of REs may be selected from each ECCE to form an HARQ indicator channel, so that each ECCE in the PRB pair includes the same number of REs after puncturing.

S330. Puncture the partial resources.

S340. Send the HARQ indicator information to the UE through the punctured partial resources.

Specifically, S340 specifically includes: dividing the punctured partial resources into at least two parts, where the number of resource elements REs in each part is in equality and no less than 2; spreading, according to the number of REs in each part, the HARQ indicator information by a corresponding bit sequence; setting repeatedly the sequence-spread HARQ indicator information on the REs in each part; and transmitting the partial resources to the UE.

Further, S320 includes: selecting the partial resources from one PRB pair of the EPDCCH resources, where the number of spread sequences corresponding to the number of REs included in the partial resources is equal to a value acquired by multiplying the number of ECCEs included in the one PRB pair by 2.

In this embodiment, a manner in which HARQ indicator information belonging to a UE is transmitted in one PRB pair is called a localized manner.

Further, before the transmitting the partial resources to the UE, the method further includes:

associating one DMRS in the one PRB pair with the sequence-spread HARQ indicator information.

With the method for transmitting HARQ indicator information according to this embodiment, partial resources are selected from a PRB pair of EPDCCH resources, and HARQ indicator information is sent to a UE through the punctured partial resources. Therefore, the UE can determine, by detecting the HARQ indicator information transmitted by a base station, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Figure 4A:
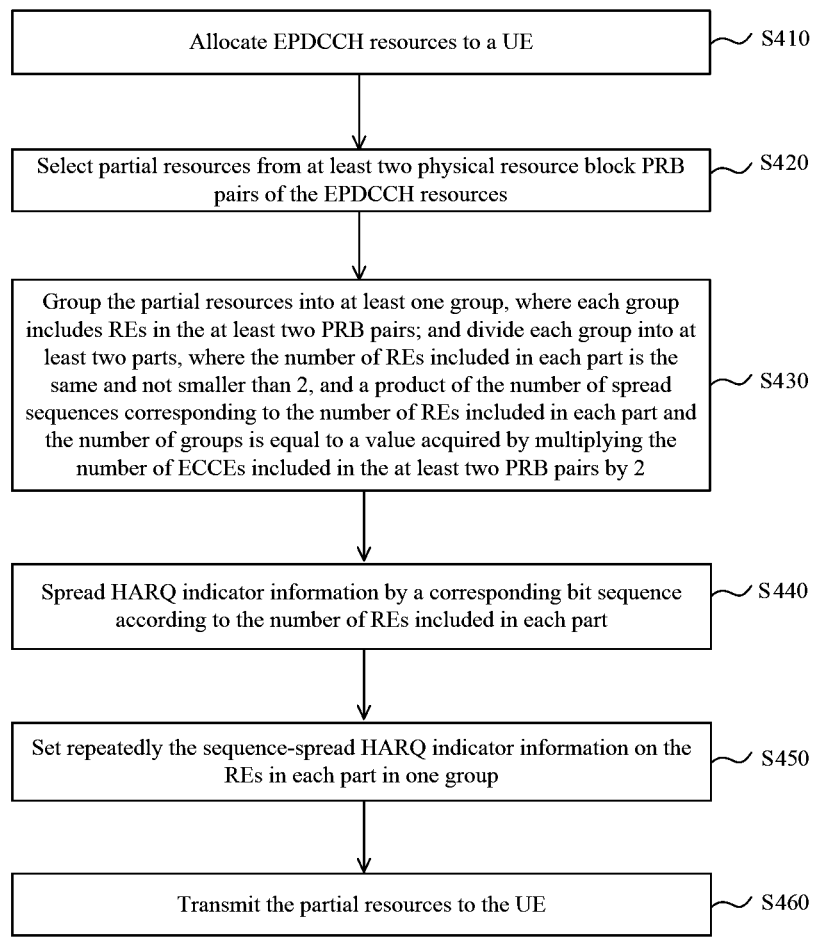
FIG. 4A is a flowchart of a method for transmitting HARQ indicator information according to a fourth embodiment of the present invention.

FIG. 4A is a flowchart of a method for transmitting HARQ indicator information according to a fourth embodiment of the present invention. This embodiment is further optimized on a basis of the foregoing second embodiment. An implementation scenario of this embodiment is that REs in at least two PRB pairs are selected as partial resources. As shown in FIG. 4A, the method according to this embodiment may include the following steps:

S410. Allocate EPDCCH resources to a UE.

S420. Select partial resources from at least two PRB pairs of the EPDCCH resources.

The at least two PRB pairs may be located in one EPDCCH PRB set configured for the UE or located in different EPDCCH PRB sets configured for the UE.

S430. Group the partial resources into at least one group, where each group includes REs in the at least two PRB pairs; and divide each group into at least two parts, where the number of REs included in each part is in equality and no less than 2, and a product of the number of spread sequences corresponding to the number of REs included in each part and the number of groups is equal to a value acquired by multiplying the number of ECCEs included in the at least two PRB pairs by 2.

It is assumed that: the partial resources are selected from two PRB pairs with a normal CP in S420, and the partial resources are grouped into two groups and each group is divided into three parts in S430, where each part includes four REs. Therefore, a product of the number of spread sequences corresponding to the number of REs included in each part and the number of groups, namely, 2, is 8*2=16, while a product of the number of ECCEs included in the two PRB pairs with a normal CP and 2 is 8*2=16. Therefore, in such a scenario, capacity of an HARQ indicator channel reaches a maximum.

S440. Spread the HARQ indicator information by a corresponding bit sequence according to the number of REs included in each part.

S450. Set repeatedly the sequence-spread HARQ indicator information on the REs in each part in one group.

S460. Transmit the partial resources to the UE.

In this embodiment, a manner in which HARQ indicator information belonging to a UE is transmitted in at least two PRB pairs is called a distributed manner.

With the method for transmitting HARQ indicator information according to this embodiment, partial resources are selected from two physical resource block PRB pairs of EPDCCH resources, the partial resources are grouped into at least one group, each group is divided into at least two parts, HARQ indicator information is spread by a corresponding bit sequence according to the number of REs included in each part, and the sequence-spread HARQ indicator information is set repeatedly on the REs in each part in the one group, so as to realize a power gain of the HARQ indicator information. In addition, because a base station transmits the sequence-spread HARQ indicator information that is repeatedly set on the REs in each part, to a UE, the UE can determine, by detecting the sequence-spread HARQ indicator information that is transmitted by the base station and repeatedly set on the REs in each part, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Further, in the foregoing fourth embodiment, before S460, the method may further include: associating, for a part in the one group, a DMRS in a PRB pair where the part resides, with sequence-spread HARQ indicator information that is set in the part. Each PRB pair includes at least two parts of the one group. The associating a DMRS in a PRB pair where the part resides, with sequence-spread HARQ indicator information that is set in the part may be specifically as follows: associating, for the at least two parts in the one group in one PRB pair, at least two DMRSs in the PRB pair with the sequence-spread HARQ indicator information that is set in the at least two parts.

Further, a method for selecting partial resources from at least two PRB pairs of the EPDCCH resources, grouping the partial resources into at least one group, and dividing each group into at least two parts may be described with reference to FIGS. 4B, 4C, 4D, and 4E respectively. FIG. 4B is a schematic diagram illustrating a specific implementation of S430 in the fourth embodiment of the present invention. As shown in FIG. 4B, when the PRB pairs are a normal CP and the selected partial resources are REs of a symbol where a DMRS resides, the selected partial resources are grouped into two groups and each group is divided into four parts. The partial resources are located in two PRB pairs and may include 24 REs. The 24 REs are REs in all bold line frames in FIG. 4B, where 12 REs thereof form one group and the other 12 REs form the other group. The 12 REs included in each group are divided into four parts and each part includes three REs. A specific method for grouping and dividing partial resources occupied by HARQ indicator information may be as follows: allocating three REs that are located on a sixth symbol in a first PRB in each PRB pair and are located on third to fifth subcarriers, and three REs that are located on a seventh symbol in the first PRB and are located on eighth to tenth subcarriers to a first group, and allocating three REs that are located on the sixth symbol in the first PRB in each PRB pair and are located on the eighth to tenth subcarriers, and three REs that are located on the seventh symbol in the first PRB and are located on the third to fifth subcarriers to a second group; allocating three REs that are located on a sixth symbol in a first PRB in one PRB pair and are located on third to fifth subcarriers to a first part of the first group, allocating three REs that are located on a seventh symbol in the first PRB in the one PRB pair and are located on eighth to tenth subcarriers to a second part of the first group, allocating three REs that are located on a sixth symbol in a first PRB in the other PRB pair and are located on third to fifth subcarriers to a third part of the first group, and allocating three REs that are located on a seventh symbol in the first PRB in the other PRB pair and are located on eighth to tenth subcarriers to a fourth part of the first group; and allocating three REs that are located on the sixth symbol in the first PRB in the one PRB pair and are located on the eighth to tenth subcarriers to a first part of the second group, allocating three REs that are located on the seventh symbol in the first PRB in the one PRB pair and are located on the third to fifth subcarriers to a second part of the second group, allocating three REs that are located on the sixth symbol in the first PRB in the other PRB pair and are located on the eighth to tenth subcarriers to a third part of the second group, and allocating three REs that are located on the seventh symbol in the first PRB in the other PRB pair and are located on the third to fifth subcarriers to a fourth part of the second group. Because each part includes three REs, the HARQ indicator information may be spread by a three-bit sequence according to the number of REs included in each part. The sequence-spread HARQ indicator information is first set on three REs of one part of a group, and then the sequence-spread HARQ indicator information is repeatedly set on REs of the other three parts of the group. Therefore, a power gain of the HARQ indicator information of a user may reach 12 times, that is, 10.8 dB. In addition, because each group uses a total of six spread sequences, each group supports a total of six pieces of HARQ indicator information. In this embodiment, there are a total of two groups and therefore the two groups support a total of 12 pieces of HARQ indicator information. The two PRB pairs have a total of eight ECCEs and the eight ECCEs support a maximum of eight pieces of scheduling signaling. If each piece of scheduling signaling is used for uplink scheduling and each piece of scheduling signaling schedules two transport blocks (Transport Blocks, TBs for short), a total of 16 pieces of HARQ indicator information are required in this case, that is, maximum HARQ capacity supported by two PRB pairs is 16 in this case. Therefore, with reference to the method for selecting the partial resources occupied by the HARQ indicator information and grouping and dividing the selected partial resources, which is described in FIG. 4B, HARQ capacity supported by two PRB pairs is 12, which is 12/16 of the supported maximum capacity. In addition, after REs occupied by the HARQ indicator information are punctured, the number of REs included in each ECCE is the same, namely, 33. It should be noted herein that FIG. 4B is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 4B and is not described herein again.

Further, FIG. 4C is a schematic diagram illustrating another specific implementation of S430 in the fourth embodiment of the present invention. As shown in FIG. 4C, when the PRB pairs are a normal CP and the selected partial resources are REs of a symbol where a DMRS resides, the selected partial resources are grouped into three groups and each group is divided into four parts. The partial resources are located in two PRB pairs and may include 24 REs. The 24 REs are REs in all bold line frames in FIG. 4C, where the 24 REs are grouped into three groups and each group includes eight REs. The eight REs included in each group are divided into four parts and each part includes two REs. A specific method for grouping and dividing partial resources occupied by HARQ indicator information may be as follows: allocating four REs that are located on sixth and seventh symbols in a first PRB in each PRB pair and are located on third and fourth subcarriers to a first group, allocating four REs that are located on the sixth and seventh symbols in the first PRB in each PRB pair and are located on fifth and eighth subcarriers to a second group, and allocating four REs that are located on the sixth and seventh symbols in the first PRB in each PRB pair and are located on ninth and tenth subcarriers to a third group; allocating, according to a difference of subcarriers, four REs that are located on sixth and seventh symbols in a first PRB in one PRB pair and are located on third and fourth subcarriers to two parts of the first group, and allocating, according to corresponding subscribers, four REs that are located on sixth and seventh symbols in a first PRB in the other PRB pair and are located on third and fourth subcarriers to the other two parts of the first group; allocating, according to corresponding subcarriers, four REs that are located on the sixth and seventh symbols in the first PRB in the one PRB pair and are located on fifth and eighth subcarriers to two parts of the second group, and allocating, according to corresponding subcarriers, four REs that are located on the sixth and seventh symbols in the first PRB in the other PRB pair and are located on fifth and eighth subcarriers to the other two parts of the second group; and allocating, according to corresponding subcarriers, four REs that are located on the sixth and seventh symbols in the first PRB in the one PRB pair and are located on ninth and tenth subcarriers to two parts of the third group, and allocating, according to corresponding subcarriers, four REs that are located on the sixth and seventh symbols in the first PRB in the other PRB pair and are located on ninth and tenth subcarriers to the other two parts of the third group. Because each part includes two REs, the HARQ indicator information may be spread by a two-bit sequence according to the number of REs included in each part. The sequence-spread HARQ indicator information is first set on two REs of one part of a group, and then the sequence-spread HARQ indicator information is repeatedly set on REs of the other three parts of the group. Therefore, a power gain of the HARQ indicator information of a user may reach 8 times, that is, 9 dB. In addition, because each group uses a total of four spread sequences, each group supports a total of four pieces of HARQ indicator information. In this embodiment, there are a total of three groups and therefore the three groups support a total of 12 pieces of HARQ indicator information. Maximum HARQ capacity supported by two PRB pairs is 16. Therefore, with reference to the method for selecting the partial resources occupied by the HARQ indicator information and grouping and dividing the selected partial resources, which is described in FIG. 4C, HARQ capacity supported by two PRB pairs is 12, which is 12/16 of the supported maximum capacity. In addition, after REs occupied by the HARQ indicator information are punctured, the number of REs included in each ECCE is the same, namely, 33. It should be noted herein that FIG. 4C is just described by using an example that the selected partial resources are REs in a first PRB in the two PRB pairs. Certainly, REs in a second PRB in the two PRB pairs may also be selected as the selected partial resources, and a method for grouping and dividing the selected partial resources is similar to the method described in FIG. 4C and is not described herein again.

Further, FIG. 4D is a schematic diagram illustrating still another specific implementation of S430 in the fourth embodiment of the present invention. As shown in FIG. 4D, when the PRB pairs are a normal CP and the selected partial resources are not REs of a symbol where a DMRS resides, the selected partial resources are grouped into two groups and each group is divided into four parts. The partial resources are located in two PRB pairs and may include 32 REs. The 32 REs are REs in all bold line frames in FIG. 4D, where the 32 REs are grouped into two groups and each group includes 16 REs. The 16 REs included in each group are divided into four parts and each part includes four REs. A specific method for grouping and dividing partial resources occupied by HARQ indicator information may be as follows: allocating eight REs that are located on third and fourth symbols in a first PRB in each PRB pair and are located on first, second, seventh, and eighth subcarriers to a first group, and allocating eight REs that are located on the third and fourth symbols in the first PRB in each PRB pair and are located on fifth, sixth, eleventh, and twelfth subcarriers to a second group; allocating, according to corresponding subcarriers, eight REs that are located on third and fourth symbols in a first PRB in one PRB pair and are located on first, second, seventh, and eighth subcarriers to two parts of the first group in sequence, and allocating, according to corresponding subcarriers, eight REs that are located on third and fourth symbols in a first PRB in the other PRB pair and are located on first, second, seventh, and eighth subcarriers to the other two parts of the first group in sequence; and allocating, according to corresponding subcarriers, eight REs that are located on the third and fourth symbols in the first PRB in the one PRB pair and are located on fifth, sixth, eleventh, and twelfth subcarriers to two parts of the second group in sequence, and allocating, according to corresponding subcarriers, eight REs that are located on the third and fourth symbols in the first PRB in the one PRB pair and are located on fifth, sixth, eleventh, and twelfth subcarriers to the other two parts of the second group in sequence. Because each part includes four REs, the HARQ indicator information may be spread by a four-bit sequence according to the number of REs included in each part. The sequence-spread HARQ indicator information is first set on four REs of one part of a group, and then the sequence-spread HARQ indicator information is repeatedly set on REs of the other three parts of the group. Therefore, a power gain of the HARQ indicator information of a user may reach 16 times, that is, 12 dB. In addition, because each group uses a total of eight spread sequences, each group supports a total of eight pieces of HARQ indicator information. In this embodiment, there are a total of two groups and therefore the two groups support a total of 16 pieces of HARQ indicator information. Maximum HARQ capacity supported by two PRB pairs is 16. Therefore, with reference to the method for selecting the partial resources occupied by the HARQ indicator information and grouping and dividing the selected partial resources, which is described in FIG. 4D, HARQ capacity supported by two PRB pairs is 16, that is, the supported maximum capacity is reached. In addition, after REs occupied by the HARQ indicator information are punctured, the number of REs included in each ECCE is the same, namely, 32. It should be noted herein that FIG. 4D is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 4D and is not described herein again.

Further, FIG. 4E is a schematic diagram illustrating still another specific implementation of S430 in the fourth embodiment of the present invention. As shown in FIG. 4E, when the PRB pairs are an extended CP and the selected partial resources are not REs of a symbol where a DMRS resides, the selected partial resources are grouped into one group and the group is divided into four parts. The partial resources are located in two PRB pairs and may include 16 REs. The 16 REs are REs in all bold line frames in FIG. 4E, where the 16 REs are grouped into one group. The 16 REs included in the group are divided into four parts and each part includes four REs. A specific method for grouping and dividing partial resources occupied by HARQ indicator information may be as follows: allocating eight REs that are located on second and third symbols in a first PRB in each PRB pair and are located on first, second, seventh, and eighth subcarriers to a group; and allocating, according to corresponding subcarriers, eight REs that are located on second and third symbols in a first PRB in one PRB pair and are located on first, second, seventh, and eighth subcarriers to two parts of the group in sequence, and allocating, according to corresponding subcarriers, eight REs that are located on second and third symbols in a first PRB in the other PRB pair and are located on first, second, seventh, and eighth subcarriers to the other two parts of the group in sequence. Because each part includes four REs, the HARQ indicator information may be spread by a four-bit sequence according to the number of REs included in each part. The sequence-spread HARQ indicator information is first set on four REs of one part of a group, and then the sequence-spread HARQ indicator information is repeatedly set on REs of the other three parts of the group. Therefore, a power gain of the HARQ indicator information of a user may reach 16 times, that is, 12 dB. In addition, because each group uses a total of eight spread sequences, each group supports a total of eight pieces of HARQ indicator information. In this embodiment, there is a total of one group and therefore the group supports a total of eight pieces of HARQ indicator information. Because two PRB pairs have a total of four ECCEs in a case of an extended CP, maximum HARQ capacity supported is 8. Therefore, with reference to the method for selecting the partial resources occupied by the HARQ indicator information and grouping and dividing the selected partial resources, which is described in FIG. 4E, HARQ capacity supported by two PRB pairs is 8, that is, the supported maximum capacity is reached. In addition, after REs occupied by the HARQ indicator information are punctured, the number of REs included in each ECCE is the same, namely, 34. It should be noted herein that FIG. 4E is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 4E and is not described herein again.

Figure 5A:
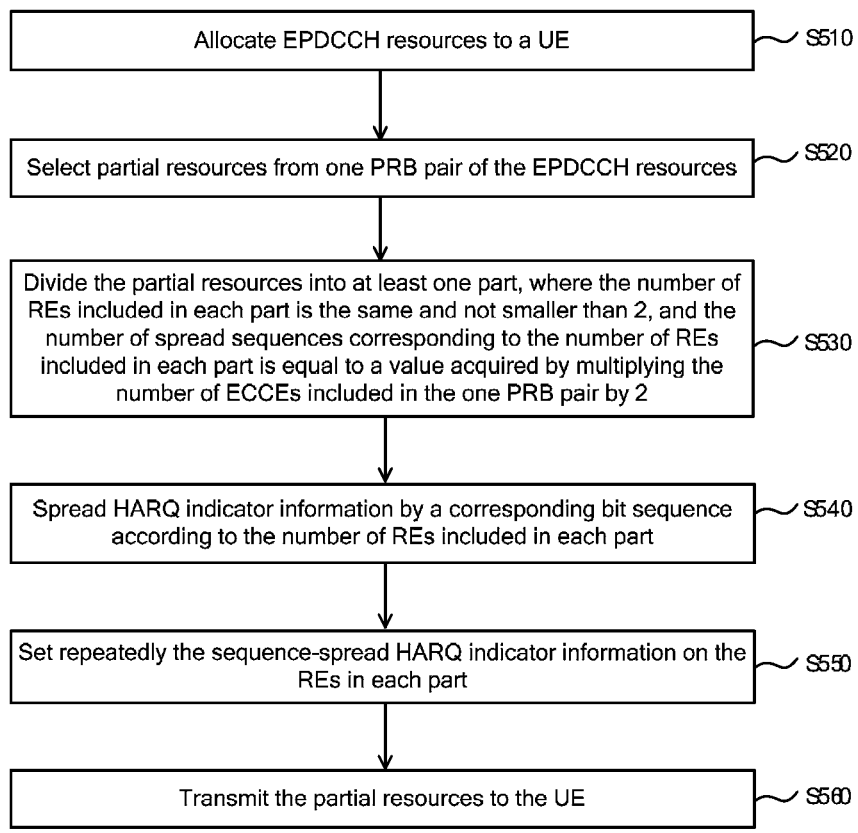
FIG. 5A is a flowchart of a method for transmitting HARQ indicator information according to a fifth embodiment of the present invention.

FIG. 5A is a flowchart of a method for transmitting HARQ indicator information according to a fifth embodiment of the present invention. An implementation scenario of this embodiment is that REs in one PRB in one PRB pair are selected as partial resources. As shown in FIG. 5A, the method according to this embodiment may include the following steps:

S510. Allocate EPDCCH resources to a UE.

S520. Select partial resources from one PRB pair of the EPDCCH resources.

S530. Divide the partial resources into at least one part, where the number of REs included in each part is in equality and no less than 2, and the number of spread sequences corresponding to the number of REs included in each part is equal to a value acquired by multiplying the number of ECCEs included in the one PRB pair by 2.

S540. Spread HARQ indicator information by a corresponding bit sequence according to the number of REs included in each part.

S550. Set repeatedly the sequence-spread HARQ indicator information on the REs in each part.

S560. Transmit the partial resources to the UE.

With the method for transmitting HARQ indicator information according to this embodiment, partial resources are selected from one PRB pair of EPDCCH resources, the partial resources are divided into at least one part, HARQ indicator information is spread by a corresponding bit sequence according to the number of REs included in each part, and the sequence-spread HARQ indicator information is set repeatedly on the REs in each part, so as to realize a power gain of the HARQ indicator information. In addition, because a base station transmits the sequence-spread HARQ indicator information that is repeatedly set on the REs in each part, to a UE, the UE can determine, by detecting the sequence-spread HARQ indicator information that is transmitted by the base station and repeatedly set on the REs in each part, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Further, in the foregoing fifth embodiment, before the transmitting the partial resources to the UE, the method may further include:

associating one DMRS in the one PRB pair with the sequence-spread HARQ indicator information.

Further, a method for selecting partial resources from one PRB pair of the EPDCCH resources and dividing the partial resources into at least one part may be described with reference to the following FIGS. 5B, 5C, and 5D respectively. FIG. 5B is a schematic diagram illustrating a specific implementation of S530 in the fifth embodiment of the present invention. As shown in FIG. 5B, when the PRB pair is a normal CP and the selected partial resources are REs of a symbol where a DMRS resides, the selected partial resources are divided into three parts. The partial resources are located in one PRB pair and may include 12 REs. The 12 REs are REs in all bold line frames in FIG. 5B, where the 12 REs are divided into three parts and each part includes four REs. A specific method for dividing partial resources occupied by HARQ indicator information may be as follows: allocating four REs that are located on sixth and seventh symbols in a first PRB in one PRB pair and are located on third and fourth subcarriers to a first part, allocating four REs that are located on the sixth and seventh symbols in the first PRB in the one PRB pair and are located on fifth and eighth subcarriers to a second part, and allocating four REs that are located on the sixth and seventh symbols in the first PRB in the one PRB pair and are located on ninth and tenth subcarriers to a third part. Because each part includes four REs, the HARQ indicator information may be spread by a four-bit sequence according to the number of REs included in each part. The sequence-spread HARQ indicator information is first set on four REs of one part, and then the sequence-spread HARQ indicator information is repeatedly set on REs of the other three parts of one group. Therefore, a power gain of the HARQ indicator information of a user may reach 12 times, that is, 10.8 dB. In addition, because a total of eight spread sequences are used, a total of eight pieces of HARQ indicator information are supported. In this embodiment, in a case of a normal CP, one PRB pair has four ECCEs and maximum HARQ capacity supported is 8. Therefore, with reference to the method for selecting the partial resources occupied by the HARQ indicator information and dividing the selected partial resources, which is described in FIG. 5B, HARQ capacity supported by one PRB pair is 8, that is, the supported maximum capacity is reached. In addition, after REs occupied by the HARQ indicator information are punctured, the number of REs included in each ECCE is the same, namely, 33. It should be noted herein that FIG. 5B is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 5B and is not described herein again.

FIG. 5C is a schematic diagram illustrating another specific implementation of S530 in the fifth embodiment of the present invention. As shown in FIG. 5C, when the PRB pair is a normal CP and the selected partial resources are not REs of a symbol where a DMRS resides, the selected partial resources are divided into three parts. The partial resources are located in one PRB pair and may include 12 REs. The 12 REs are REs in all bold line frames in FIG. 5C, where the 12 REs are divided into three parts and each part includes four REs. A specific method for dividing partial resources occupied by HARQ indicator information may be as follows: allocating four REs that are located on a third symbol in a first PRB in one PRB pair and are located on first to fourth subcarriers to a first part, allocating four REs that are located on the third symbol in the first PRB in the one PRB pair and are located on fifth to eighth subcarriers to a second part, and allocating four REs that are located on the third symbol in the first PRB in the one PRB pair and are located on ninth to twelfth subcarriers to a third part. Because each part includes four REs, the HARQ indicator information may be spread by a four-bit sequence according to the number of REs included in each part. The sequence-spread HARQ indicator information is first set on four REs of one part, and then the sequence-spread HARQ indicator information is repeatedly set on REs of the other three parts of one group. Therefore, a power gain of the HARQ indicator information of a user may reach 12 times, that is, 10.8 dB. In addition, because a total of eight spread sequences are used, a total of eight pieces of HARQ indicator information are supported. In this embodiment, in a case of a normal CP, one PRB pair has four ECCEs and maximum HARQ capacity supported is 8. Therefore, with reference to the method for selecting the partial resources occupied by the HARQ indicator information and dividing the selected resources, which is described in FIG. 5C, HARQ capacity supported by one PRB pair is 8, that is, the supported maximum capacity is reached. In addition, after REs occupied by the HARQ indicator information are punctured, the number of REs included in each ECCE is the same, namely, 33. It should be noted herein that FIG. 5C is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 5C and is not described herein again.

Figures 5D, 6:
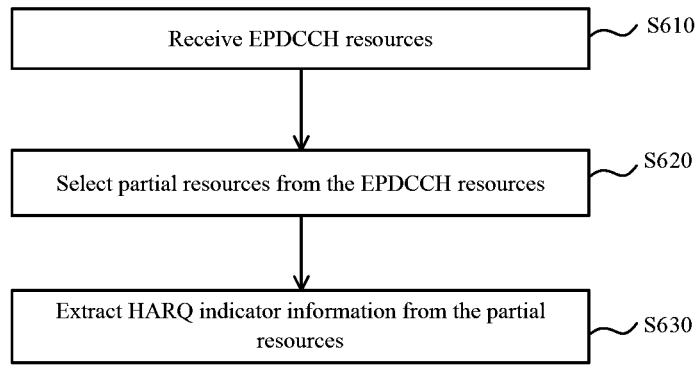
FIG. 5D is a schematic diagram illustrating still another specific implementation of S530 in the fifth embodiment of the present invention.
FIG. 6 is a flowchart of a method for transmitting HARQ indicator information according to a sixth embodiment of the present invention.

FIG. 5D is a schematic diagram illustrating still another specific implementation of S530 in the fifth embodiment of the present invention. As shown in FIG. 5D, when the PRB pair is a normal CP and the selected partial resources are not REs of a symbol where a DMRS resides, the selected partial resources are divided into three parts. If the PRB pair is an extended CP and the selected partial resources are not REs of a symbol where a DMRS resides, the partial resources are located in one PRB pair and may include 12 REs. The 12 REs are REs in all bold line frames in FIG. 5D, where the 12 REs are divided into six parts and each part includes two REs. A specific method for dividing partial resources occupied by HARQ indicator information may be as follows: allocating two REs that are located on a third symbol in a first PRB in one PRB pair and are located on first and second subcarriers to a first part, allocating two REs that are located on the third symbol in the first PRB in the one PRB pair and are located on third and fourth subcarriers to a second part, allocating two REs that are located on the third symbol in the first PRB in the one PRB pair and are located on fifth and sixth subcarriers to a third part, allocating two REs that are located on the third symbol in the first PRB in the one PRB pair and are located on seventh and eighth subcarriers to a fourth part, allocating two REs that are located on the third symbol in the first PRB in the one PRB pair and are located on ninth and tenth subcarriers to a fifth part, and allocating two REs that are located on the third symbol in the first PRB in the one PRB pair and are located on eleventh and twelfth subcarriers to a sixth part. Because each part includes two REs, the HARQ indicator information may be spread by a two-bit sequence according to the number of REs included in each part. The sequence-spread HARQ indicator information is first set on two REs of one part, and then the sequence-spread HARQ indicator information is repeatedly set on REs of the other three parts of one group. Therefore, a power gain of the HARQ indicator information of a user may reach 12 times, that is, 10.8 dB. In addition, because a total of four spread sequences are used, a total of four pieces of HARQ indicator information are supported. In this embodiment, in a case of an extended CP, one PRB pair has two ECCEs and maximum HARQ capacity supported is 4. Therefore, with reference to the method for selecting the partial resources occupied by the HARQ indicator information and dividing the selected partial resources, which is described in FIG. 5D, HARQ capacity supported by one PRB pair is 4, that is, the supported maximum capacity is reached. In addition, after REs occupied by the HARQ indicator information are punctured, the number of REs included in each ECCE is the same, namely, 33. It should be noted herein that FIG. 5D is just described by using an example that the selected partial resources are REs in a first PRB in two PRB pairs. Certainly, REs in a second PRB in the two PRB pairs may also be selected as the selected partial resources, and a method for grouping and dividing the selected partial resources is similar to the method described in FIG. 5D and is not described herein again.

FIG. 6 is a flowchart of a method for transmitting HARQ indicator information according to a sixth embodiment of the present invention. The method is executed by a UE. As shown in FIG. 6, the method includes the following steps:

S610. Receive EPDCCH resources.

S620. Select partial resources from the EPDCCH resources.

S630. Extract HARQ indicator information from the partial resources.

With the method for transmitting HARQ indicator information according to this embodiment, partial resources are selected from EPDCCH resources and HARQ indicator information is extracted from the partial resources. Therefore, a UE can determine, by detecting the extracted HARQ indicator information, whether data transmitted in an uplink is correctly decoded by a base station and thereby determine whether to send new data or retransmit the previous data, which does not require the base station to resend new scheduling signaling for controlling the UE to retransmit the previous data, thereby reducing signaling load of a control channel of a system.

Figure 7:
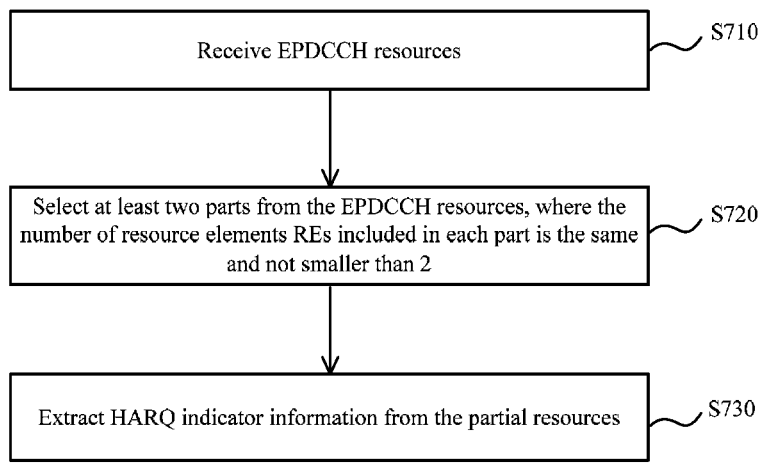
FIG. 7 is a flowchart of a method for transmitting HARQ indicator information according to a seventh embodiment of the present invention.

FIG. 7 is a flowchart of a method for transmitting HARQ indicator information according to a seventh embodiment of the present invention. This embodiment is further fractionized on a basis of the foregoing sixth embodiment. As shown in FIG. 7, the method according to this embodiment may include the following steps:

S710. Receive EPDCCH resources.

S720. Select at least two parts from the EPDCCH resources, where the number of resource elements REs included in each part is in equality and no less than 2.

In S720, the at least two parts are selected from at least two physical resource block PRB pairs of the EPDCCH resources, where the at least two parts include REs in the two PRB pairs. For a specific method for selecting the at least two parts, reference may be made to the dividing methods shown in FIGS. 4B, 4C, 4D, and 4E in the foregoing fourth embodiment. A method corresponding to the dividing methods shown in FIGS. 4B, 4C, 4D, and 4E is used to select the at least two parts from the at least two PRB pairs. Or the at least two parts are selected from one PRB pair of the EPDCCH resources. For a specific method for selecting the at least two parts from one PRB pair of the EPDCCH resources, reference may be made to the dividing methods shown in FIGS. 5B, 5C, and 5D in the foregoing fifth embodiment. A method corresponding to the dividing methods shown in FIGS. 5B, 5C, and 5D is used to select the at least two parts from one PRB pair of the EPDCCH resources.

S730. Extract HARQ indicator information from the partial resources.

S730 includes at least two specific implementation manners. A first specific implementation manner is as follows: performing channel estimation according to a DMRS corresponding to each part in the at least two parts, and performing soft modulation on each part to acquire soft information about each part; and performing, after combining the soft information about each part, sequence despreading according to the number of REs included in each part to acquire the HARQ indicator information. A second specific implementation manner is as follows: performing channel estimation according to a DMRS corresponding to each part in the at least two parts, and performing soft demodulation on each part to acquire soft information about each part; performing sequence despreading on each part according to the number of REs included in each part to acquire sequence-despread soft information about each part; and combining the sequence-despread soft information about each part to acquire the HARQ indicator information.

For example, if a base station selects eight REs occupied by the EPDCCH resources to carry an HARQ indicator channel, the eight REs are divided into two parts and the two parts are associated with DMRS A and DMRS B separately. For ease of description, the two parts are named part A and part B. Each part includes four REs. For ease of description, four REs in part A are named RE{A,1}, RE{A,2}, RE{A,3}, and RE{A,4}, and four REs in part B are named RE{B,1}, RE{B,2}, RE{B,3}, and RE{B,4}.

After one piece of HARQ indicator information is modulated, spreading by a 4-bit sequence is performed, that is, a sequence [+,+,+,+] is used for spreading, and the spread sequence is placed in the four REs in each part.

A UE receives signals of the two parts, namely, a total of eight REs. It is assumed that the received signals are y{A,1}, y{A,2}, y{A,3}, y{A,4}, y{B,1}, y{B,2}, y{B,3}, and y{B,4}. For the four REs in part A, the UE uses DMRS A to perform channel estimation to acquire channel estimation values of the four REs in part A: h{A,1}, h{A,2}, h{A,3}, and h{A,4}; for the four REs in part B, the UE uses DMRS B to perform channel estimation to acquire channel estimation values of the four REs in part B: h{B,1}, h{B,2}, h{B,3}, and h{B,4}. The UE demodulates, according to the channel estimation values, the eight REs separately to acquire demodulation signals $\underline{y}\{A,1\}=y\{A,1\}/h\{A,1\}$, $\underline{y}\{A,2\}=y\{A,2\}/h\{A,2\}$, $\underline{y}\{A,3\}=y\{A,3\}/h\{A,3\}$, $\underline{y}\{A,4\}=y\{A,4\}/h\{A,4\}$, $\underline{y}\{B,1\}=y\{B,1\}/h\{B,1\}$, $\underline{y}\{B,2\}=y\{B,2\}/h\{B,2\}$, $\underline{y}\{B,3\}=y\{B,3\}/h\{B,3\}$, and $\underline{y}\{B,4\}=y\{B,4\}/h\{B,4\}$.

For the first specific implementation manner of S730, that is, the manner in which combination is performed before despreading, the UE first combines the REs in the two parts on a one-to-one correspondence basis to acquire signals $x\{1\}=\underline{y}\{A,1\}+\underline{y}\{B,1\}$, $x\{2\}=\underline{y}\{A,2\}+y\{B,2\}$, $x\{3\}=\underline{y}\{A,3\}+\underline{y}\{B,3\}$, and $x\{4\}=\underline{y}\{A,4\}+\underline{y}\{B,4\}$, and then uses the sequence [+,+,+,+] to perform despreading on the combined signals to acquire a received value of the HARQ indicator information: $x=x\{1\}+x\{2\}+x\{3\}+x\{4\}$.

For the second specific implementation manner of S730, that is, the manner in which despreading is performed before combination, the UE first uses the sequence [+,+,+,+] to perform despreading on the REs in the two parts to acquire signals $x\{A\}=\underline{y}\{A,1\}+\underline{y}\{A,2\}+\underline{y}\{A,3\}+\underline{y}\{A,4\}$ and $x\{B\}=\underline{y}\{B,1\}+\underline{y}\{B,2\}+\underline{y}\{B,3\}+\underline{y}\{B,4\}$, and then combines the despread signals to acquire a received value of the HARQ: $x=x\{A\}+x\{B\}$.

With the method for transmitting HARQ indicator information according to this embodiment, at least two parts are selected from EPDCCH resources, soft information is acquired for combination from the at least two parts, and sequence despreading is performed according to the number of REs included in each part to acquire HARQ indicator information. Therefore, a UE can determine, by detecting the acquired HARQ indicator information, whether data transmitted in an uplink is correctly decoded by a base station and thereby determine whether to send new data or retransmit the previous data, which does not require the base station to resend new scheduling signaling for controlling the UE to retransmit the previous data, thereby reducing signaling load of a control channel of a system.

Further, in the foregoing seventh embodiment, before the performing channel estimation according to a demodulation reference signal DMRS corresponding to each part in the at least two parts, the method may further include: extracting, from a PRB pair to which each part belongs, the DMRS corresponding to each part.

Figure 8:
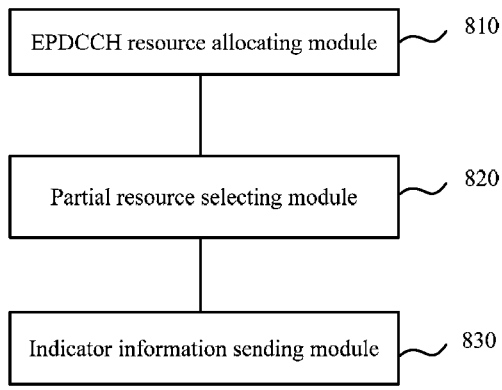
FIG. 8 is a schematic diagram of an apparatus for transmitting HARQ indicator information according to an eighth embodiment of the present invention.

FIG. 8 is a schematic diagram of an apparatus for transmitting HARQ indicator information according to an eighth embodiment of the present invention. As shown in FIG. 8, the apparatus includes:

an EPDCCH resource allocating module 810, configured to allocate EPDCCH resources to a UE;

a partial resource selecting module 820, configured to select partial resources from the EPDCCH resources; and an indicator information sending module 830, configured to send HARQ indicator information to the UE through the partial resources.

Further, the partial resource selecting module 820 is specifically configured to select the partial resources from a physical resource block PRB pair of the EPDCCH resources.

Further, the indicator information sending module 830 includes:

a first part dividing unit, configured to divide the partial resources into at least two parts, where the number of resource elements REs included in each part is in equality and no less than 2;

a first sequence spreading unit, configured to spread the HARQ indicator information by a corresponding bit sequence according to the number of REs included in each part;

a first information repeated setting unit, configured to repeatedly set the sequence-spread HARQ indicator information on the REs in each part; and a first partial resource transmitting unit, configured to transmit the partial resources to the UE.

Further, the partial resource selecting module 820 is specifically configured to select the partial resources from the PRB pair of the EPDCCH resources, so that each enhanced control channel element ECCE in the PRB pair includes the same number of REs after puncturing.

The indicator information sending module is specifically configured to:

puncture the partial resources; and send the HARQ indicator information to the UE through the punctured partial resources.

Further, the first part dividing unit is specifically configured to divide the partial resources into the at least two parts according to required HARQ channel capacity, where the number of spread sequences corresponding to the number of REs included in each part meets the required HARQ channel capacity.

Optionally, the partial resource selecting module 820 is specifically configured to select the partial resources from at least two physical resource block PRB pairs of the EPDCCH resources.

Further, the indicator information sending module 830 includes:

a second part dividing unit, configured to: group the partial resources into at least one group, where each group includes REs in the two PRB pairs; and divide each group into at least two parts, where a product of the number of spread sequences corresponding to the number of REs included in each part and the number of groups is equal to a value acquired by multiplying the number of ECCEs included in the at least two PRB pairs by 2;

a second sequence spreading unit, configured to spread the HARQ indicator information by a corresponding bit sequence according to the number of REs included in each part;

a second information repeated setting unit, configured to repeatedly set the sequence-spread HARQ indicator information on the REs in each part in one group; and a second partial resource transmitting unit, configured to transmit the partial resources to the UE.

Further, the apparatus further includes:

a first indicator information associating module, configured to associate, for a part in the one group before the second partial resource transmitting unit transmits the partial resources to the UE, a DMRS signal in a PRB pair where the part resides, with the sequence-spread HARQ indicator information that is set in the part.

Further, each PRB pair includes the at least two parts in the one group. The first indicator information associating module is specifically configured to associate, for the at least two parts in the one group in one PRB pair, at least two DMRSs in the PRB pair with the sequence-spread HARQ indicator information that is set in the at least two parts.

Optionally, the at least two PRB pairs are located in one EPDCCH PRB set configured for the UE or are located in different EPDCCH PRB sets configured for the UE.

Optionally, the partial resource selecting module 820 is specifically configured to select the partial resources from one PRB pair of the EPDCCH resources.

Further, the indicator information sending module 830 includes:

a third part dividing unit, configured to divide the partial resources into at least one part, where the number of REs included in each part is in equality and no less than 2, and the number of spread sequences corresponding to the number of REs included in each part is equal to a value acquired by multiplying the number of ECCEs included in the one PRB pair by 2;

a third sequence spreading unit, configured to spread the HARQ indicator information by a corresponding bit sequence according to the number of REs included in each part;

a third information repeated setting unit, configured to repeatedly set the sequence-spread HARQ indicator information on the REs in each part; and a third partial resource transmitting unit, configured to transmit the partial resources to the UE.

Further, the apparatus further includes:

a second indicator information associating module, configured to associate, before the third partial resource transmitting unit transmits the partial resources to the UE, one DMRS in the one PRB pair with the sequence-spread HARQ indicator information.

With the apparatus for transmitting HARQ indicator information according to this embodiment, partial resources are selected from EPDCCH resources and HARQ indicator information is sent to a UE. Therefore, a base station can transmit the HARQ indicator information to the UE through the partial resources selected from the EPDCCH resources, and the UE can determine, by detecting the HARQ indicator information transmitted by the base station, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Figure 9:
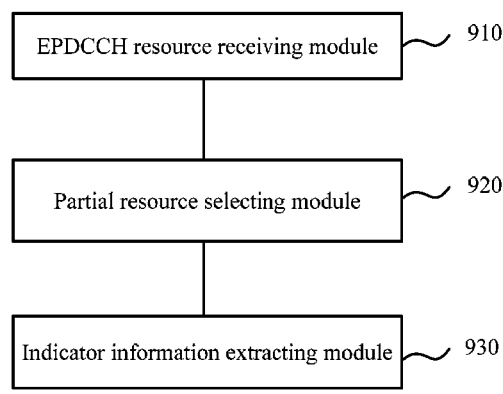
FIG. 9 is a schematic diagram of an apparatus for transmitting HARQ indicator information according to a ninth embodiment of the present invention.

FIG. 9 is a schematic diagram of an apparatus for transmitting HARQ indicator information according to a ninth embodiment of the present invention. As shown in FIG. 9, the apparatus includes:

an EPDCCH resource receiving module 910, configured to receive EPDCCH resources;

a partial resource selecting module 920, configured to select partial resources from the EPDCCH resources; and an indicator information extracting module 930, configured to extract HARQ indicator information from the partial resources.

Further, the partial resource selecting module 920 is specifically configured to select at least two parts from the EPDCCH resources, where the number of resource elements REs included in each part is in equality and no less than 2; and the indicator information extracting module 930 is specifically configured to perform channel estimation according to a demodulation reference signal DMRS corresponding to each part in the at least two parts and perform soft demodulation on each part to acquire soft information about each part; and perform, after combining the soft information about each part, sequence despreading according to the number of REs included in each part to acquire the HARQ indicator information; or perform channel estimation according to a demodulation reference signal DMRS corresponding to each part in the at least two parts, and perform soft demodulation on each part to acquire soft information about each part; perform sequence despreading on each part according to the number of REs included in each part to acquire sequence-despread soft information about each part; and combine the sequence-despread soft information about each part to acquire the HARQ indicator information.

Further, the apparatus further includes:

a DMRS extracting module, configured to extract, before the indicator information extracting module performs channel estimation according to the demodulation reference signal DMRS corresponding to each part in the at least two parts, the DMRS corresponding to each part from a PRB pair to which each part belongs.

Optionally, the partial resource selecting module 920 is specifically configured to select the at least two parts from at least two physical resource block PRB pairs of the EPDCCH resources, where the at least two parts include REs in the two PRB pairs.

Optionally, the partial resource selecting module 920 is specifically configured to:

select the at least two parts from one PRB pair of the EPDCCH resources.

With the apparatus for transmitting HARQ indicator information according to this embodiment, partial resources are selected from EPDCCH resources and HARQ indicator information is extracted from the partial resources. Therefore, a UE can determine, by detecting the extracted HARQ indicator information, whether data transmitted in an uplink is correctly decoded by a base station and thereby determine whether to send new data or retransmit the previous data, which does not require the base station to resend new scheduling signaling for controlling the UE to retransmit the previous data, thereby reducing signaling load of a control channel of a system.

Figure 10:
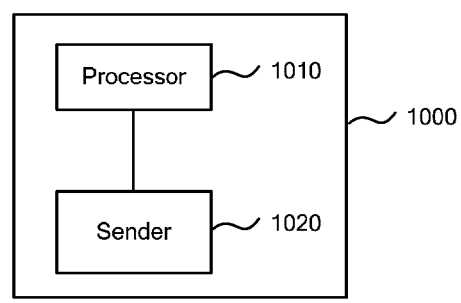
FIG. 10 is a schematic structural diagram of a base station 1000 according to a tenth embodiment of the present invention.

FIG. 10 is a schematic structural diagram of a base station 1000 according to a tenth embodiment of the present invention. As shown in FIG. 10, the base station 1000 includes:

a processor 1010, configured to allocate EPDCCH resources to a UE and select partial resources from the EPDCCH resources; and a transmitter 1020, configured to send HARQ indicator information to the UE through the partial resources.

Further, the processor 1010 is specifically configured to allocate the EPDCCH resources to the UE and select the partial resources from a PRB pair of the EPDCCH resources.

Further, the transmitter 1020 is specifically configured to:

divide the partial resources into at least two parts, where the number of resource elements REs included in each part is in equality and no less than 2;

spread the HARQ indicator information by a corresponding bit sequence according to the number of REs included in each part;

set repeatedly the sequence-spread HARQ indicator information on the REs in each part; and transmit the partial resources to the UE.

Further, the selecting partial resources from the EPDCCH resources includes:

selecting the partial resources from the PRB pair of the EPDCCH resources, so that each ECCE in the PRB pair includes the same number of REs after puncturing.

The transmitter 1020 is specifically configured to puncture the partial resources and send, through the punctured partial resources, the HARQ indicator information to the UE.

Further, the dividing the partial resources into at least two parts includes:

dividing the partial resources into the at least two parts according to required HARQ channel capacity, where the number of spread sequences corresponding to the number of REs included in each part meets the required HARQ channel capacity.

Optionally, the selecting partial resources from the EPDCCH resources includes:

selecting the partial resources from at least two physical resource block PRB pairs of the EPDCCH resources.

The dividing the partial resources into at least two parts includes:

grouping the partial resources into at least one group, where each group includes REs in the two PRB pairs; and dividing each group into at least two parts, where a product of the number of spread sequences corresponding to the number of REs included in each part and the number of groups is equal to a value acquired by multiplying the number of ECCEs included in the at least two PRB pairs by 2.

The setting repeatedly the sequence-spread HARQ indicator information on the REs in each part includes:

setting repeatedly the sequence-spread HARQ indicator information on the REs in each part in one group.

Further, the transmitter 1020 is further configured to associate, for a part in the one group before the partial resources are transmitted to the UE, a DMRS signal in a PRB pair where the part resides, with the sequence-spread HARQ indicator information that is set in the part.

Further, each PRB pair includes the at least two parts in the one group. The associating a DMRS signal in a PRB pair where the part resides, with the sequence-spread HARQ indicator information that is set in the part includes:

associating, for the at least two parts in the one group in one PRB pair, at least two DMRSs in the PRB pair with the sequence-spread HARQ indicator information that is set in the at least two parts.

Optionally, the at least two PRB pairs are located in one EPDCCH PRB set configured for the UE or are located in different EPDCCH PRB sets configured for the UE.

Optionally, the selecting partial resources from the EPDCCH resources includes:

selecting the partial resources from one PRB pair of the EPDCCH resources.

Further, the transmitter 1020 is specifically configured to:

divide the partial resources into at least one part, where the number of REs included in each part is in equality and no less than 2, and the number of spread sequences corresponding to the number of REs included in each part is equal to a value acquired by multiplying the number of ECCEs included in the one PRB pair by 2;

spread the HARQ indicator information by a corresponding bit sequence according to the number of REs included in each part;

set repeatedly the sequence-spread HARQ indicator information on the REs in each part; and transmit the partial resources to the UE.

Further, the transmitter 1020 is further configured to associate one DMRS in the one PRB pair with the sequence-spread HARQ indicator information before the partial resources are transmitted to the UE.

With the base station according to this embodiment, partial resources are selected from EPDCCH resources and HARQ indicator information is extracted from the partial resources. Therefore, a UE can determine, by detecting the extracted HARQ indicator information, whether data transmitted in an uplink is correctly decoded by the base station and thereby determine whether to send new data or retransmit the previous data, which does not require the base station to resend new scheduling signaling for controlling the UE to retransmit the previous data, thereby reducing signaling load of a control channel of a system.

Figure 11:
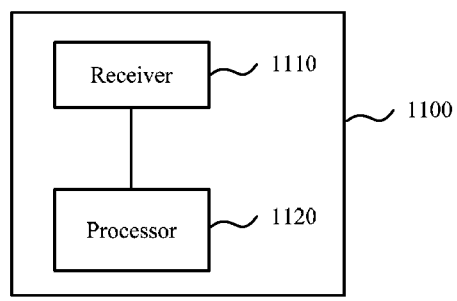
FIG. 11 is a schematic structural diagram of a UE 1100 according to an eleventh embodiment of the present invention.

FIG. 11 is a schematic structural diagram of a UE 1100 according to an eleventh embodiment of the present invention. As shown in FIG. 11, the UE 1100 includes:

a receiver 1110, configured to receive EPDCCH resources; and a processor 1120, configured to select partial resources from the EPDCCH resources and extract HARQ indicator information from the partial resources.

Further, the selecting partial resources from the EPDCCH resources includes:

selecting at least two parts from the EPDCCH resources, where the number of resource elements REs included in each part is in equality and no less than 2.

The extracting HARQ indicator information from the partial resources includes:

performing channel estimation according to a demodulation reference signal DMRS corresponding to each part in the at least two parts, and performing soft demodulation on each part to acquire soft information about each part; and performing, after combining the soft information about each part, sequence despreading according to the number of REs included in each part to acquire the HARQ indicator information; or performing channel estimation according to a demodulation reference signal DMRS corresponding to each part in the at least two parts, and performing soft demodulation on each part to acquire soft information about each part; performing sequence despreading on each part according to the number of REs included in each part to acquire sequence-despread soft information about each part; and combining the sequence-despread soft information about each part to acquire the HARQ indicator information.

Further, the processor 1120 is further configured to extract, before channel estimation is performed according to the demodulation reference signal DMRS corresponding to each part in the at least two parts, the DMRS corresponding to each part from a PRB pair to which each part belongs.

Optionally, the selecting at least two parts from the EPDCCH resources includes:

selecting the at least two parts from at least two physical resource block PRB pairs of the EPDCCH resources, where the at least two parts include REs in the two PRB pairs.

Optionally, the selecting at least two parts from the EPDCCH resources includes:

selecting the at least two parts from one PRB pair of the EPDCCH resources.

With the UE according to this embodiment, partial resources are selected from EPDCCH resources and HARQ indicator information is extracted from the partial resources. Therefore, the UE can determine, by detecting the extracted HARQ indicator information, whether data transmitted in an uplink is correctly decoded by a base station and thereby determine whether to send new data or retransmit the previous data, which does not require the base station to resend new scheduling signaling for controlling the UE to retransmit the previous data, thereby reducing signaling load of a control channel of a system.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method performed by a base station for transmitting hybrid automatic repeat request (HARQ) indicator information, comprising:
   allocating enhanced physical downlink control channel (EPDCCH) resources to a user equipment (UE);
   selecting partial resources from the EPDCCH resources;
   sending the HARQ indicator information to the UE through the partial resources;
   wherein the selecting the partial resources from the EPDCCH resources comprises:
   selecting the partial resources from at least two PRB pairs of the EPDCCH resources;
   wherein the sending the HARQ indicator information to the UE through the partial resources comprises:
   grouping the partial resources into at least one group, wherein each group comprises resource elements (REs) in the at least two PRB pairs; and dividing each group into at least two parts, wherein the number of REs comprised in each part is the same and no less than 2, and a product of the number of spread sequences corresponding to the number of REs comprised in each part and the number of groups is equal to a value acquired by multiplying the number of enhanced control channel elements (ECCEs) comprised in the at least two PRB pairs by 2;
   spreading the HARQ indicator information by a corresponding bit sequence according to the number of REs comprised in each part;
   setting repeatedly the sequence-spread HARQ indicator information on the REs in each part in one group;
   transmitting the partial resources to the UE;
   wherein before the transmitting the partial resources to the UE, the method further comprising:
   associating, for a part in the one group, a demodulation reference signal (DMRS) in a PRB pair where the part resides, with the sequence-spread HARQ indicator information that is set in the part;
   wherein each PRB pair comprises the at least two parts in the one group, and the associating the DMRS in the PRB pair where the part resides, with the sequence-spread HARQ indicator information that is set in the part comprises:
   associating, for the at least two parts in the one group in one PRB pair, at least two DMRSs in the PRB pair with the sequence-spread HARQ indicator information that is set in the at least two parts.

2. A base station comprising: a processor and a transmitter, wherein
   the processor is configured to allocate enhanced physical downlink control channel (EPDCCH) resources to a user equipment (UE) and select partial resources from the EPDCCH resources;
   the transmitter is configured to send hybrid automatic repeat request (HARQ) indicator information to the UE through the partial resources;
   wherein the processor is configured to select the partial resources from the EPDCCH resources comprises the processor is configured to select the partial resources from at least two PRB pairs of the EPDCCH resources;
   wherein the transmitter is configured to send the HARQ indicator information to the UE through the partial resources comprises:
   the transmitter is configured to:
   group the partial resources into at least one group, wherein each group comprises resource elements (REs) in the at least two PRB pairs; and divide each group into at least two parts, wherein the number of REs comprised in each part is the same and no less than 2, and a product of the number of spread sequences corresponding to the number of REs comprised in each part and the number of groups is equal to a value acquired by multiplying the number of enhanced control channel elements (ECCEs) comprised in the at least two PRB pairs by 2;
   spread the HARQ indicator information by a corresponding bit sequence according to the number of REs comprised in each part;
   set repeatedly the sequence-spread HARQ indicator information on the REs in each part in one group;
   transmit the partial resources to the UE;
   wherein before transmitting the partial resources to the UE, the transmitter is configured to: associate, for a part in the one group, a demodulation reference signal (DMRS) in a PRB pair where the part resides, with the sequence-spread HARQ indicator information that is set in the part;

wherein each PRB pair comprises the at least two parts in the one group, and the transmitter is configured to associate the DMRS in the PRB pair where the part resides, with the sequence-spread HARO indicator information that is set in the part comprises:

the transmitter is configured to associate, for the at least two parts in the one group in one PRB pair, at least two DMRSs in the PRB pair with the sequence-spread HARO indicator information that is set in the at least two parts.

* * * * *